United States Patent

[11] 3,546,381

[72] Inventors Daniel E. Foley
Nutley, New Jersey;
Willian F. Hogan, Scarsdale, New York
[21] Appl. No. 742,686
[22] Filed July 5, 1968
[45] Patented Dec. 8, 1970
[73] Assignee Data Presentations, Inc.
Scarsdale, New York
a corporation of New York

[54] TELEPHONE MESSAGE DATA DEVICE
25 Claims, 12 Drawing Figs.

[52] U.S. Cl. ........ 179/7.1
[51] Int. Cl. ........ H04m 15/20
[50] Field of Search ........ 179/7, 7.1, 11, 7.1(TP), 5.5, 8.6

[56] References Cited
UNITED STATES PATENTS

| | | | |
|---|---|---|---|
| 2,613,274 | 10/1952 | Stehlik | 179/7 |
| 3,185,769 | 5/1965 | Lombard | 179/7.1 |

*Primary Examiner*—Kathleen H. Claffy
*Assistant Examiner*—Jan S. Black
*Attorney*—James and Franklin

ABSTRACT: The present apparatus is used by a volume telephone subscriber to record the local extension that is calling, the outside number that is being called, the length of the call, and if desired the time and date of the call, all without direct connection into the telephone line, which is usually a flat rate line. The voice message is not monitored or tapped. The present apparatus comprises a dial signal detector, a recorder, and a sensor responsive to off-hook to connect the dial signal detector and to start the recorder. There is means to translate and encode the dialed signal into a signal compatible with the recorder. The apparatus may time as well as record the call, and a timing device is used which also has an output compatible with the recorder, and which includes switch means to start and stop the recorder. The apparatus has means responsive to answerback to start the timing device, and means responsive to on-hook to stop the timing device. It is usually desired to identify and record the extension making the call, and for this purpose the caller must dial an extension identification signal before it can be connected to the line. The timing device cannot record the terminal time and the elapsed time until after on-hook, and therefore delay means is provided to hold the busy condition at the PBX for a time sufficient for recording of the timer output. The subscriber may need operator assistance, and in such case the program is canceled out, except for a response to on-hook. The switching equipment in the telephone exchange causes a series of "hits" which spuriously resemble on-hook. The response to on-hook is therefore disabled for a delay period sufficient for the dialing operation. Even on hanging up there may be hits and transients, and precaution is taken against them. The apparatus may be modified to handle "Touch-Tone" dialing instead of rotary dialing.

INVENTORS
DANIEL E. FOLEY
WILLIAM F. HOGAN
BY
James and Franklin
ATTORNEYS

INVENTORS
DANIEL E. FOLEY
WILLIAM F. HOGAN
BY
James and Franklin
ATTORNEYS

INVENTORS
DANIEL E. FOLEY
WILLIAM F. HOGAN

BY James and Franklin

ATTORNEYS

INVENTORS
DANIEL E. FOLEY
WILLIAM F. HOGAN

BY

James and Franklin

ATTORNEYS

INVENTORS
DANIEL E. FOLEY
WILLIAM F. HOGAN
BY
James and Franklin
ATTORNEYS

INVENTORS
DANIEL E. FOLEY
WILLIAM F. HOGAN
BY
James and Franklin
ATTORNEYS

INVENTORS
DANIEL E. FOLEY
WILLIAM F. HOGAN

BY James and Franklin

ATTORNEYS

INVENTORS
DANIEL E. FOLEY
WILLIAM F. HOGAN
BY James and Franklin
ATTORNEYS

INVENTORS
DANIEL E. FOLEY
WILLIAM F. HOGAN

BY James and Franklin

ATTORNEYS

TELEPHONE MESSAGE DATA DEVICE

BACKGROUND OF THE INVENTION

The telephone companies provide special arrangements for bulk users of communications facilities. There are, for example, "WATS" lines (wide area telephone service), foreign exchange trunks, full period tie lines, and others, all of which may be generally referred to as "flat rate" lines. Subscribers using such flat rate lines are at a loss for information to allocate the cost to different divisions of the company, or to see whether the lines are being sufficiently utilized to pay their way. On the other hand, the lines may be too heavily used, and a question arises whether to lease additional flat rate lines. The subscriber does not know whether his employees are loading the circuits with personal calls, which to them seem unlimited and therefore free, and even true business calls may be of excessive length or frequency in the case of certain employees.

Elaborate message accounting equipment is already used in telephone exchanges, but such equipment is not available to a flat rate subscriber, because the telephone company insists that elimination of such detailed data is essential to maintain the reduced charge made for bulk services. Broadly stated, the purpose of the present invention is to supply telephone useage data by apparatus located at the subscriber, without interference or degradation to telephone service. The apparatus translates signals that establish and later stop telephone connection, into a format useable in data processing.

SUMMARY OF THE INVENTION

The control signals here involved include off-hook, rotary dial pulses or pushbutton tone signals both referred to generically as dial signals, disconnect, ringback, answerback, and on-hook. (in the case of busy or reorder the caller simply hangs up, and a dial tone also has its usual significance.) Ringback means the reflected ringing audible in the receiver of the calling telephone while the called station is being rung. There is no true answerback signal and instead in this apparatus answerback refers to the absence of ringback for more than the normal interval between rings (4 seconds) not accompanied by a return to on-hook. This starts timing of the call when timing is provided.

Control signals such as off-hook, on-hook and rotary dial pulse signals are DC in nature. However, dial tone and ringback signals are transformer-induced AC but they are "Nonvoice" signals having little or no effect on the DC condition of the telephone circuit.

The present device differs greatly from the telephone company accounting apparatus because the present device is not tied directly into a telephone line. It is coupled through RC and/or LC couplings. The RC coupling responds only to changes in DC line voltage, and not to the steady state value of the DC voltage. For example, a square-wave dialing-pulse becomes two sharp spikes. Moreover, all kinds of transients or so-called "hits" resulting from the switching gear in the telephone exchange, cause additional spikes or hits which are spurious for the present purpose.

The present device discriminates between the two types of control signal by the use of the two types of couplings. A resistance-capacitance (RC) coupling is used for response to DC voltage changes. An associated translation circuit distinguishes the polarity of these changes, and from this information, coupled with the rate of occurrence, it reconstructs dial signals for recording; marks the beginning and the end of holding time or call duration; and controls the transfer to a WATS or other flat rate line. The nonvoice AC signals are sensed via an inductance-capacitance (LC) coupling; are amplified by a special telephone pickup circuit; and are rectified to provide logic functions in response to signals such as ringback.

The present apparatus has a dial signal detector, a recorder, a sensor responsive to off-hook in order to connect the dialing station to the detector and start the recorder. There is means to translate and encode the dialed signal into a signal compatible with and sent to the recorder, and means to then stop the recorder. The apparatus preferably times as well as records the call, and a known timing device is used which also has an output compatible with the recorder, and which includes switch means to start and stop the recorder. Answerback starts the timing device, and on-hook stops it.

In practical form there usually are multiple hile extensions and a PBX (Private Branch Exchange) at the subscriber, and it is desired to identify the extension making the call. For this purpose the extension must first dial an extension identification signal before it is connected by the present device to the flat-rate line.

The timing device cannot record the terminal time or the elapsed time of the call until after on-hook, which normally would disable the apparatus, and we therefore provide means to hold the busy condition at the PBX after on-hook for a time sufficient for recording of the output of the timing device.

The subscriber man may need operator assistance, and then will dial "operator," and in such case the program of the apparatus is canceled out, except for a response to on-hook.

An answerback detector is needed, and for this purpose we provide a ringback detector selectively responsive to the ringing frequency, and a means responsive to the absence of ringback for a period longer than the normal interval between rings, to indicate answerback.

When the called number is dialed the switching equipment in the telephone exchange causes a series of transients or hits which resemble on-hook, and which therefore could cause premature restoration to idle condition. We accordingly provide a means to disable the response to on-hook for a predetermined delay period sufficient for the dialing operation. Moreover, on actually hanging up there may be hits or transients caused by the switchgear at the telephone exchange which may prevent the intended response to on-hook by concealing the positive going pulse which is expected for on-hook. We accordingly provide a further means whereby there is a response to on-hook, whether there is a positive going or a negative going pulse.

Another problem is the wide difference between a rotary dial with its DC pulses, and a pushbutton dial or "Touch-Tone" dial with its combinations of different tones. The present apparatus may be provided in a modified form to handle pushbutton dialing instead of rotary dialing.

The foregoing and additional features are described in the following detailed specification which is accompanied by drawings in which:

FIGS. 1 through 5 together form a wiring diagram for an apparatus responsive to rotary dialing, and in which FIG. 1 shows the wiring for the input circuits and an encoder;

Figures 6, 6A:
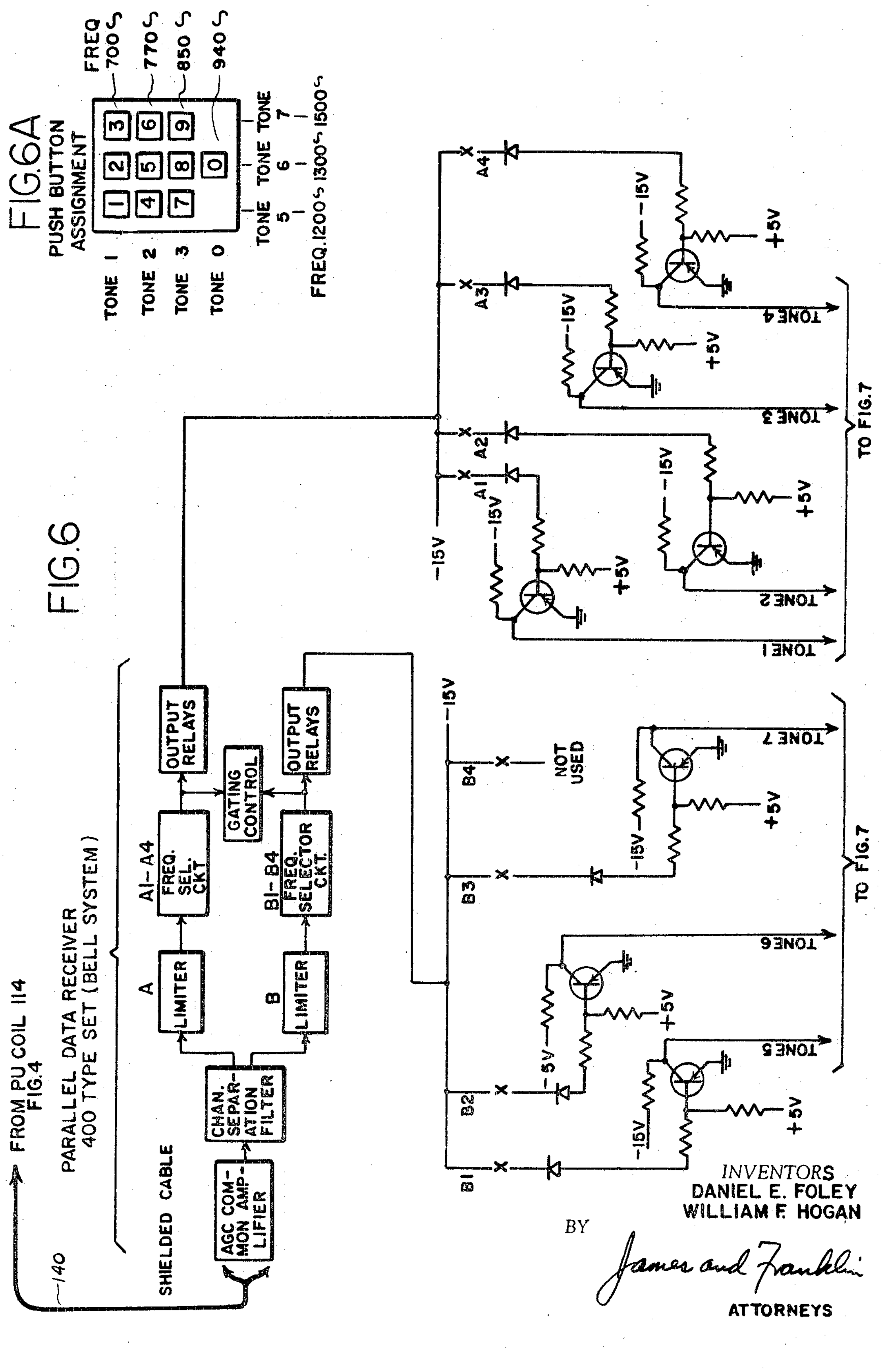
Figure 7:
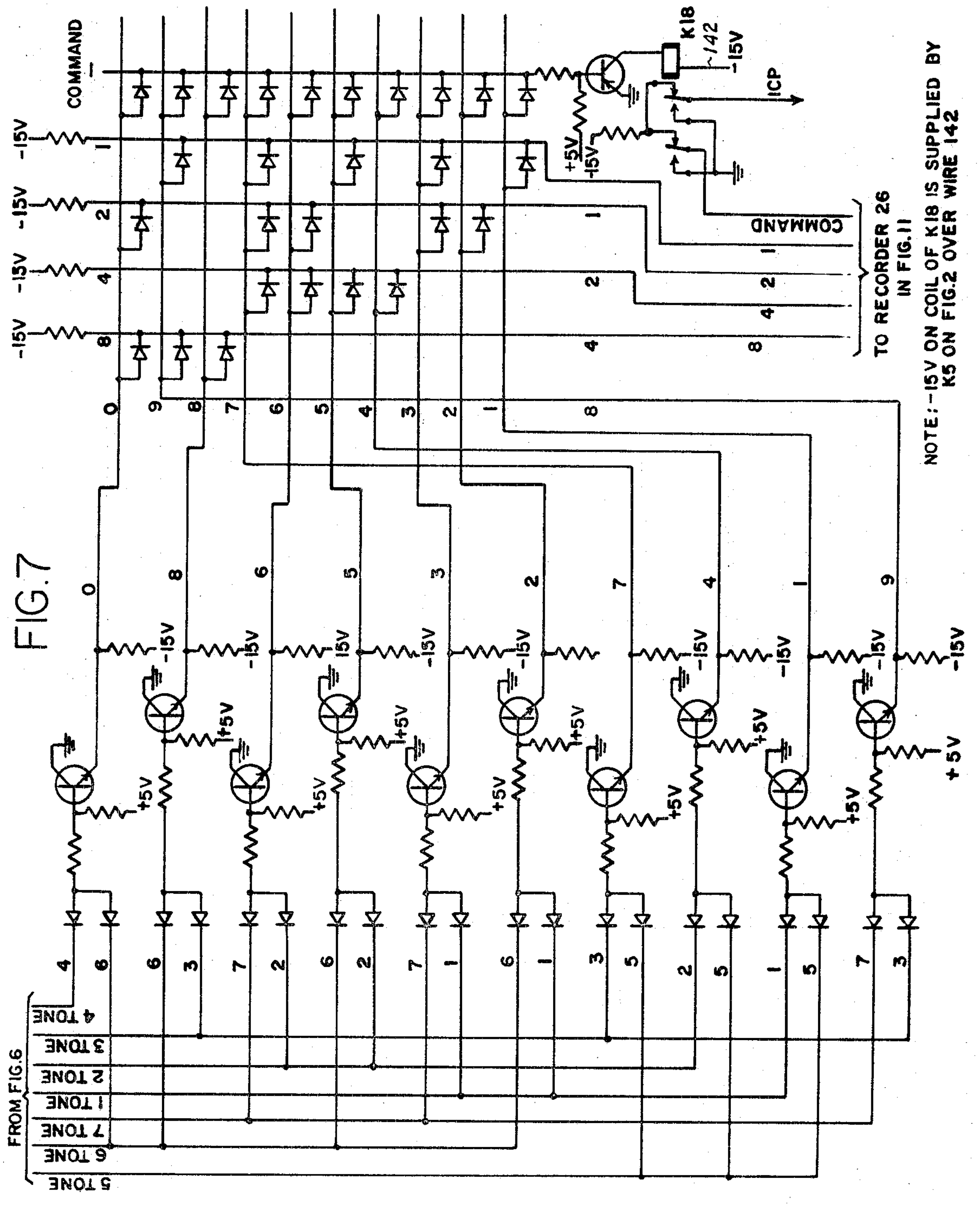
Figure 8:
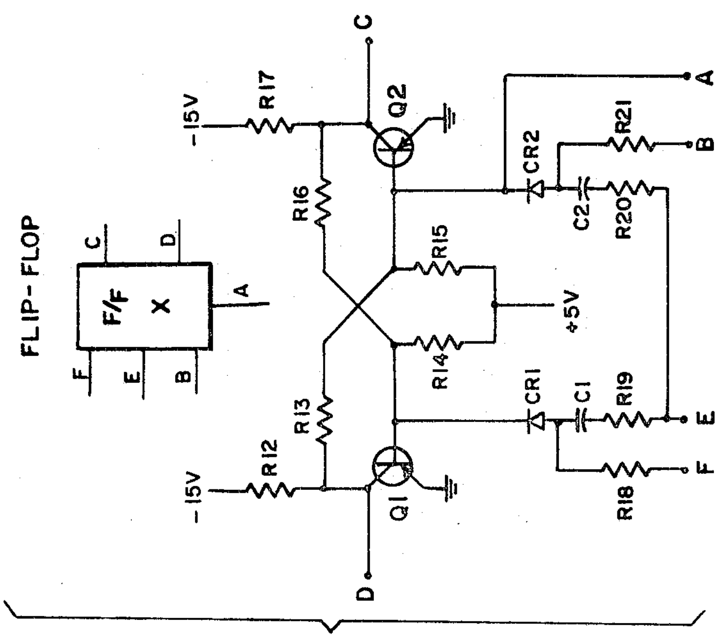
Figure 9:
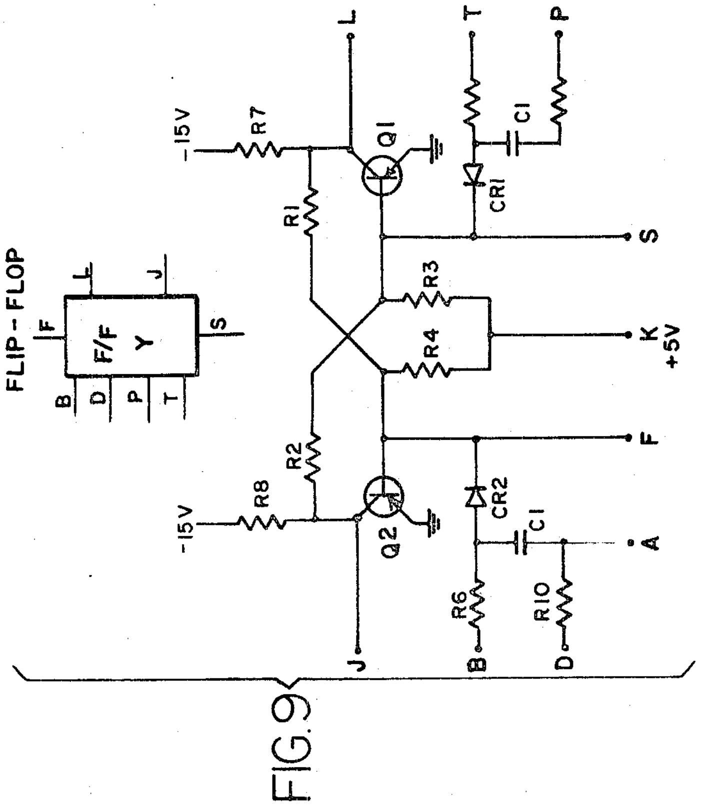
Figure 10:
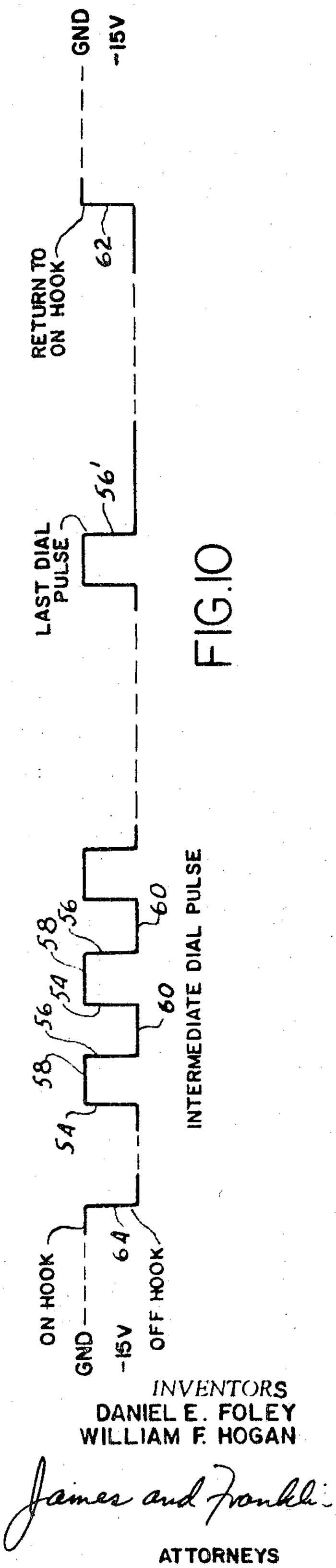

FIGS. 6 and 7 together form a wiring diagram showing modifications for response to pushbutton ("Touch-Tone") dialing;

FIGS. 8 and 9 are flip-flop wiring diagrams explanatory of symbols used in some of the other FIGS.;

FIG. 10 is a DC signal train diagram used in explaining the apparatus;

11 is a block diagram for the apparatus; and

FIG. 6A helps explain a pushbutton dial.

In the drawings the voltage supply connections indicated are direct or so-called "hard" wiring, except where otherwise noted by a footnote directly on the drawing itself. The abbreviation RB in the drawings means ringback; RBC means ringback control; PU means pickup; ICP means integer counter pulser; TFR means transfer relay; Det. means detector; PWC means power control; BCD means binary coded decimal; IDP means interdigit pulser; CA means counter access; and SWH means switch hook.

In some drawings the relays are shown in detached contact schematic format, using an X for normally open contacts, and using a single slant line for normally closed contacts. When a relay is shown in one FIG. in detached contact schematic format, it is shown with the coil and contacts in detail in another FIG.

Each flat rate line on which usage information is desired requires a separate telephone message data device (also called TMDD herein). A single line, however, may serve a number of bridged extensions. Any extension user picking up to place a call will terminate in a line-simulating network until he has dialed his extension number for identification purposes, after which the extension is switched to the line circuit, receives a dial tone, and proceeds normally. Essentially the same arrangement follows for a PBX (private branch exchange exchange) termination, that is, any extension bidding for the line will get the TMDD assigned to that line when switched by the PBX. This routine applies whether the PBX is automatic or manual, that is, the user must dial his extension to identify the extension. The arrangement here described contemplates that the flat rate line on which outward call usage is being analyzed will not be used for incoming messages. Outward-only is the normal situation for such lines. However, if two way calling is involved, usage data can be recorded locally at each origination point in standard format.

Figure 11:
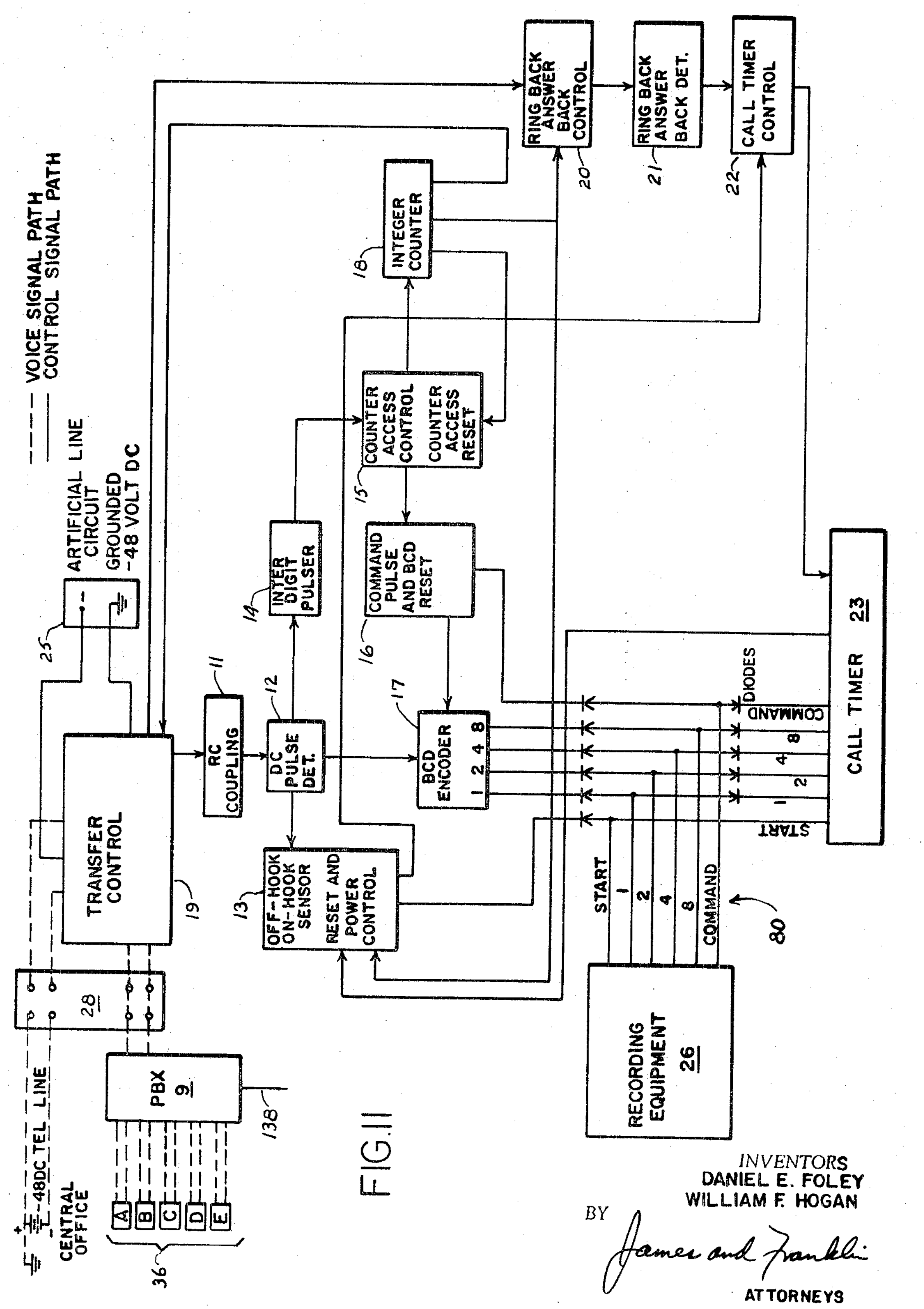

The block diagram in FIG. 11 illustrates the telephone message data device programmed for a rotary dial telephone. The circuitry or apparatus in the blocks are described later in detail. The demarcation terminal strip for the line is shown at 28. A series of functions are performed as follows;

1. Recognizing an off-hook signal on an extension telephone such as A, B or C, etc. This is accomplished by blocks 11, 12, 13, 25, and results in:
   a. activating a start circuit for the BCD (binary coded decimal) recorder, represented by block 26;
   b. activating a make-busy circuit. This applies only if there is a PBX, shown in block 9;
   c. discarding the off-hook signal (block 15);
   d. resetting a BCD encoder (block 17).
   The functions c and d are taken care of by the additional blocks 14 and 16.
2. Reconstruct the dial signals and pass them to the recorder 26 in BCD while the calling station (A, B or C etc.) is dialing its home extension number, to record the identity of the extension that is calling. This is done by blocks 12, 14, 15, 16 and 17.
3. Switch the calling station (A, B or C etc.) to the line after the home extension number is dialed. This requires blocks 18 and 19. Discard "hits" introduced by telephone company switcher when changing from idle condition to dial tone, and also false hits of any other character. This is done by blocks 15 and 16.
4. Reconstruct dial signals and pass to recorder 26 in BCD while the called number is being dialed. The recorder at 26 may punch a tape, or print a tape, or may use magnetic tape. This operation is taken care of by blocks, 11, 12, 14, 15, 16, and 17.
5. Recognize end-of-dialing (block 18), deactivate and stop the recorder 26 until disconnect (blocks 13 and 18), reset BCD encoder (blocks 15, 16 and 18), and enable ring-back detector (blocks 18 and 20).
6. When ringback is received, enabling an answerback detector which accepts 2 seconds of 20 cycle frequency, and looks for an interval of longer than 4 seconds after any 2 second ringing interval. This is done by blocks 20 and 21. As a refinement we may bypass with a true voice answerback detector, instead of a low pass filter. This refinement is useful if the answer is too swift after one fractional ring, but such refinement is thought unnecessary.
7. When answerback is received, a start circuit for the external call timer equipment 23 is activated by blocks 21 and 22.
8. At the end of the call to recognize call termination (on-hook) and do the following:
   a. When on-hook occurs prior to item 7, restoring idle condition. This is in case the call is abandoned before being completed. This involves blocks 11, 12 and 13.
   b. When on-hook occurs after item 7 above the device will
      1. Signal call timer equipment 23 to send timing data to recorder 26. This is done by blocks 22 and 23.
      2. Preempt the line while the recorder is in use in 1. This is done by blocks 13 and 23.
      30. Restore the idle condition when the call timer equipment 23 releases the recorder 26. This also is done by blocks 13 and 23.

In the event the caller needs operator assistance and dials 0 (zero) in item 4 above, the TMDD abandons the program at that point; keeps the connection intact; and monitors for disconnect (on-hook). The digit 0 will be recorded.

Two of the units which are indicated are external to but are used with the TMDD proper. These units are the recording equipment of block 26, and the call timing equipment of block 23. With respect to recording equipment, the BCD character at-a-time output arrangement of the TMDD translator presents the most universal signal to an input data recorder and/or a business machine. However, translation to other codes such as Hollerith, Baudot, ASCII (American Standard Code for Information Interchange) etc. is feasible. A punched tape recorder, either integrated or associated, is ideal for this application. Commercial examples are the Model LARP 28 of Teletype Corporation, of Skokie, Ill., a subsidiary of Western Electric Company, Inc., and that made by Ohr-tronics, Inc. of 111 West 50th Street, New York, N.Y. A magnetic tape recorder is small, versatile, quiet and has other advantages, but is more costly. If used the magnetic tape recorder should be of the digital incremental type which produces computer compatible tape, such as those made by Calma Company of Santa Clara, Calif. or Potter Instrument Co., Inc., Model NE 4210. The company is located at Plainview, Long Island, N.Y. These recorders use up to seven or eight channels on the magnetic tape, according to the code being used. If preferred, however, the information can be stored on other record devices such as a teleprinter, card punch, a business machine, or other storage devices. Visual displays may be posted also.

The system could use a conventional magnetic tape recorder with the signal recorded in serial mode by replacing the BCD encoder by a ring counter. The recorder would record signal bits in series on one channel, instead of using multiple channels for recording in a multiple level code. An example is the single track digital incremental tape recorder Model 900 made by Digitronics Corp. of Albertson, Long Island, N.Y. Later, the recording may be translated from the serial mode into a signal usable for data processing. This would be less direct and therefore less efficient, but it is feasible. In short, the information device is best suited for the customer requirements, and these devices are known to the art.

The call timing equipment of block 23 will vary in accordance with usage data needs. Where only telephone call duration or holding time is wanted, the call timer can be a counter, pulsed by a clock motor mechanism, to count units of time; the time unit being predetermined to represent minutes or fractions thereof. The timing may be in half minute (30 seconds) units, and this apparatus records the number of such units. From this simple arrangement which provides minimum usage data, timing equipment can grow to a highly sophisticated time and date generator with memory, capable of playing back to the recorder such information as date, time-of-day callup (start time), time-of-day calldown (finishing time), and holding time in hours, minutes and seconds.

Time-of-day signals can be obtained from a digital clock. Such clocks consisting of a one pulse per minute time source and three interconnected stepping switches, are common in the art. An electromechanical device of this type is manufactured by Veeder-Root Co. of Hartford, Conn., and is available commercially under under the trade name "Digi-Clock." The series is number 710840. It is a 24 hour clock having a BCD signal output, and models are available for hours and minutes readings, or hours, minutes and tenths of minutes readings and also with day and month and year if wanted. Switching apparatus in such case is employed to sequence the wires leading to the recorder 26 in FIGS. 11 and 1 to the Digi-Clock output modules to obtain time-of-day in the following order: first, tens of hours module; second, hours module; third, tens of minutes module; fourth, minutes module; and last, if used, the tenths of minutes module. This operation would first occur upon receipt of answerback, and again upon receipt of disconnect or on-hook. This same device will provide call duration data if we chose to start it running on answerback and to reset it following a disconnect reading. The timer includes a switch to start and stop the recorder. Customer requirements will dictate which timing devices should be used, and these devices are already known to the art.

The TMDD employs solid state circuitry consisting mainly of DC pulse amplifiers, triggers, multivibrators and gates. A typical multivibrator is shown in FIG. 9, together with a symbol for the same used in FIGS. 1—7. FIG. 8 differs structurally in having two on a single card. Most of the amplifiers in the circuitry submitted have relays in the output. All relays, except the Transfer Relay, and a power relay, may be replaced with solid state logic in production models. Both size and cost of the package can be reduced by integrated-circuit design. In any event, the TMDD will be small, no bigger than a telephone handset at most (without the recorder and timer). It is a relatively low cost device because the semiconductors are ordinary or general purpose components, and are inexpensive compared to special purpose components. The number of components, and their power requirements are low. The operation is unattended, little or no maintenance is required. Should it become necessary to remove the unit from service the line can be strapped through at the demarcation strip 28. A bypass switch may be provided for this purpose.

A telephone pair as seen from the subscriber end, has a negative battery terminal connected to the ring side of the jack (the other battery terminal being grounded), and has ground on the tip side of the jack. These conditions obtain for both busy and idle line conditions, but the value of the voltage, say minus 48 volts for idle, is different when the telephone is busy, say minus 15 volts. A direct current circuit is required for supervisory purposes and for powering the station's transmitter. Even where multifrequency tone dialing (Touch-Tone) is employed, the direct current circuit is required for the reasons mentioned. Changes in DC potential to ground at the subscriber station provides intelligence for the Telephone Message Data Device (TMDD). Interconnected through an RC coupling at the line terminal block (11 in FIG. 11 and 42 and 44 in FIG. 1), elements in the TMDD circuitry respond to signals involved in initiating, completing and releasing telephone calls in such manner as to record in digital form the calling station's extension number (optional), and the number dialed, and to mark the beginning and ending of the call for timing purposes. In addition to the RC coupling, an LC coupling (in block 20 of FIG. 11 and C13 and 106 in FIG. 4) is used across the line for ringback detection, and when required, for Touch-Tone dial signal detection. The LC coupling is connected only during intervals when it is needed for translation purposes in the calling process.

The equipment next described with reference to FIGS. 1—5 includes extension number identification, and assumes rotary dial signaling (DC pulsing). Since DC pulsing is in far greater use than "Touch-Tone" at this time, the latter is described later as a modification of the DC pulse system.

Figure 1:
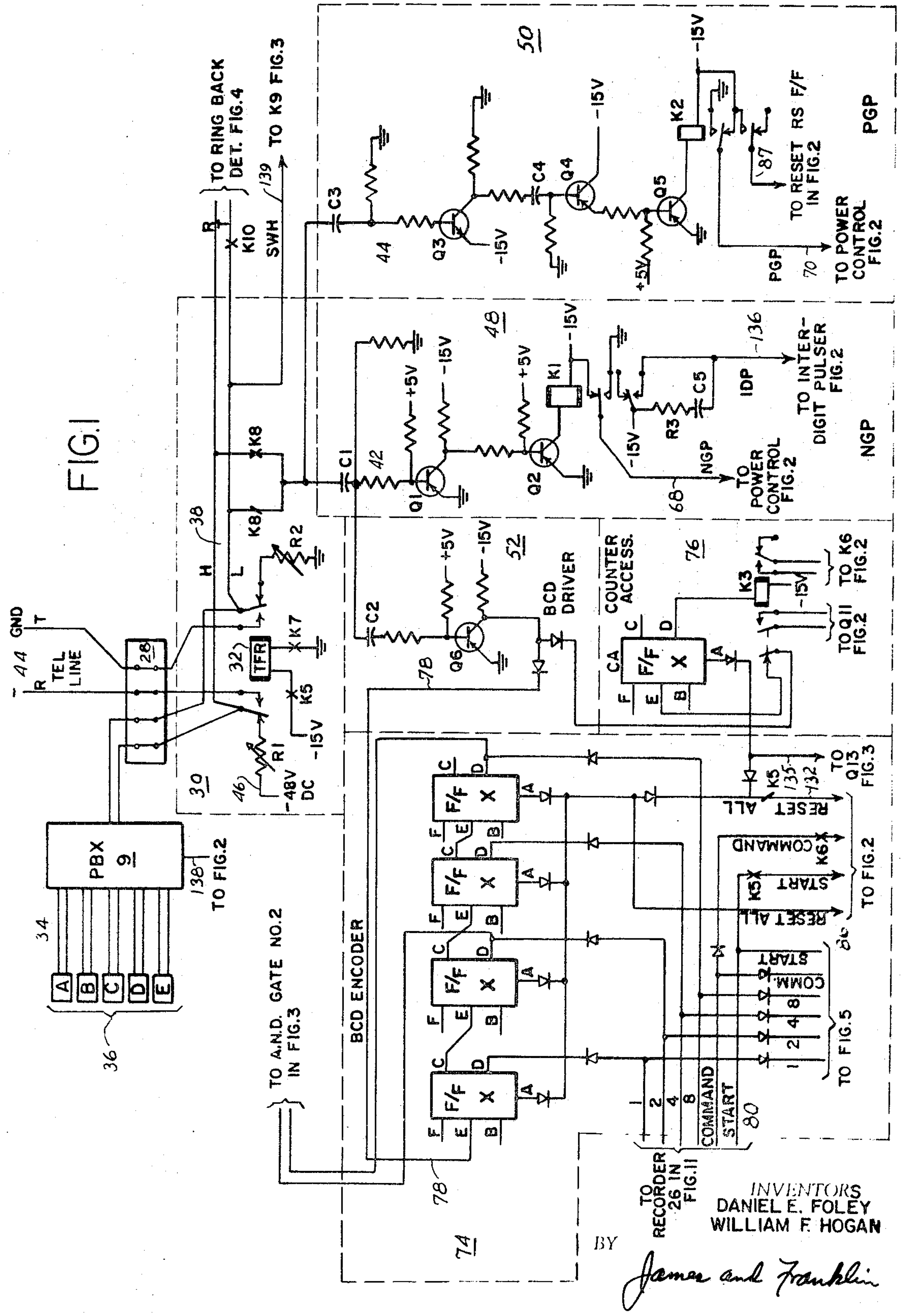

FIG. 1 illustrates the telephone line termination as it appears at the Demarcation Terminal Strip 28 and extends to the Transfer Control Circuit shown in broken line area 30, where it is open ended on contacts of Transfer (TFR) relay 32. The extension cable pairs 34 extend from PBX 9 to the extension telephone sets 36. The PBX 9 is terminated in local battery and ground on the normally closed contacts of the TFR relay 32. The voltage applied is adjusted by means of resistors R1 and R2 to simulate the central office battery to ground voltage which obtains when line and station are in continuity. Two taps 38 are taken off the two armatures of TFR relay 32 (form C) to feed the TMDD RC couplers at 42 and 44. These tap leads 38 are marked H for high voltage, and L for low voltage. Assuming a station (A or B etc.) is connected at the PBX, it is obvious from examination of the TFR relay 32 that the station 36 and line 44 (marked T and R for tip and ring respectively) will be in continuity when the relay 32 is operated (busy condition). When the relay 32 is released (standby condition) the PBX termination is powered by a local TMDD 48 volt negative DC supply at 46. The two RC couplers at 42 and 44 receive signals generated by the station until the line transfer is made, and receive signals from either the station or the line after transfer. The DC supply will change at the time of transfer also, from local battery 46 to the telephone central office battery. The approximate voltages to ground on the L lead and its relation to dial signal pulses are shown diagrammatically in FIG. 10.

The pulse detectors in dotted areas 48 and 50 and the BCD driver in area 52 are RC coupled intially to the L lead through relay K8 normally closed contact. In FIG. 1 the pulse detector 50 on the extreme right is a "positive going" pulse detector, and the adjacent pulse detector 48 is a "negative going" pulse detector. Both are transistor pulse amplifier circuits that produce a momentary operation of their respective output relays K1 and K2 in response to voltage changes on the lead L. Both remain static during steady state voltage on lead L. The first negative going transition turns on the TMDD off-hook signal (see 64 in FIG. 10) and succeeding negative going transitions 56 are the "go" signals that keep the system running. The positive going transitions 54 are the "no go" or "turn TMDD off" signals, the last of which occurs on the on-hook signal 62 (FIG. 10) and causes the power control circuit to time out and turn the system off.

By referring to FIG. 10 it will be seen that the front end 54 of a dial pulse is a positive going transition (−15 volts to ground) while the back end 56 is a negative going transition (ground to −15 volts). The voltage element 60 and the ground element 58 of a dial "one-off" cycle are each 50 milliseconds long. By making the timeout delay of the power control circuit longer than the normal dial signal element (50 milliseconds), the dial pulses are successfully bridged, as described later. Since the dial signal always ends with a negative going transition (see 56'), interdigit delays will occur during the "go" condition for power control. The on-hook signal, however, finds a positive going transition at 62 followed by no transition, and thereby causes the power control circuit to reach the turnoff state.

Basically, the TMDD responds to DC telephone signalling as just described. A number of safeguards are necessary, however, to ride out the DC hits introduced by the switching equipment at the telephone exchange. These hits are generated during both call switching and call disconnect operations. Hits that occur during call switching may cause a premature turn-off, while hits on disconnect may mask the on-hook signal and keep the system on. Hit suppression devices will be explained later in the operational details of the specification.

Reverting to FIG. 1, in the idle condition lead L of the pair 38 is at ground potential because all telephone sets such as Station A at 36 are disconnected at the PBX. A closure of switchhook contacts such as going off-hook at Station A and a connection at the PBX produces a negative going line transition (64 in FIG. 10). The negative charge carries through condenser C1 (FIG. 1) to momentarily turn on transistor Q1 which in turn drops the negative bias on the base of transistor Q2, causing Q2 to go off momentarily, resulting in the release and reoperation of relay K1. At the same time the negative potential impressed on condenser C3 serves to drive transistor Q3, which is only partially conducting, off momentarily. This action decreases the negative charge on capacitor C4 in the collector Circuit. The reduced negative charge on capacitor C4 drives the lower plate more positive and therefore transistor Q4 remains off. Relay K2 connected to the collector of transistor Q5 is unaffected since the bias on the base of transistor Q5 has not changed. There are two pulse detectors in dotted areas 48 and 50. Pulse detector 48 responds to, and pulse detector 50 is not affected by a negative going pulse, or NGP.

On a positive going line transition (−15 to ground), the action by the pulse detectors is just the reverse, that is K1 will be unaffected, and K2 will operate and release. When the top plate of capacitor C1 is charged negatively and changed to ground by a positive going line transition, the bottom plate increases positively and merely adds to the plus bias on the base of transistor Q1 which is already off, hence no further action takes place in the negative going pulse defector. In the positive going pulse detector condenser C3 top plate, changing from negative to ground, pushes the bottom plate more positive, providing greater conduction in transistor Q3, where negative voltage at the collector output will increase and will forward bias the transistor Q4 through the charging action of capacitor C4. Transistor Q4 turning on, will forward bias the transistor Q5, and it turns on momentarily to operate and restore the relay K2.

Figure 2:
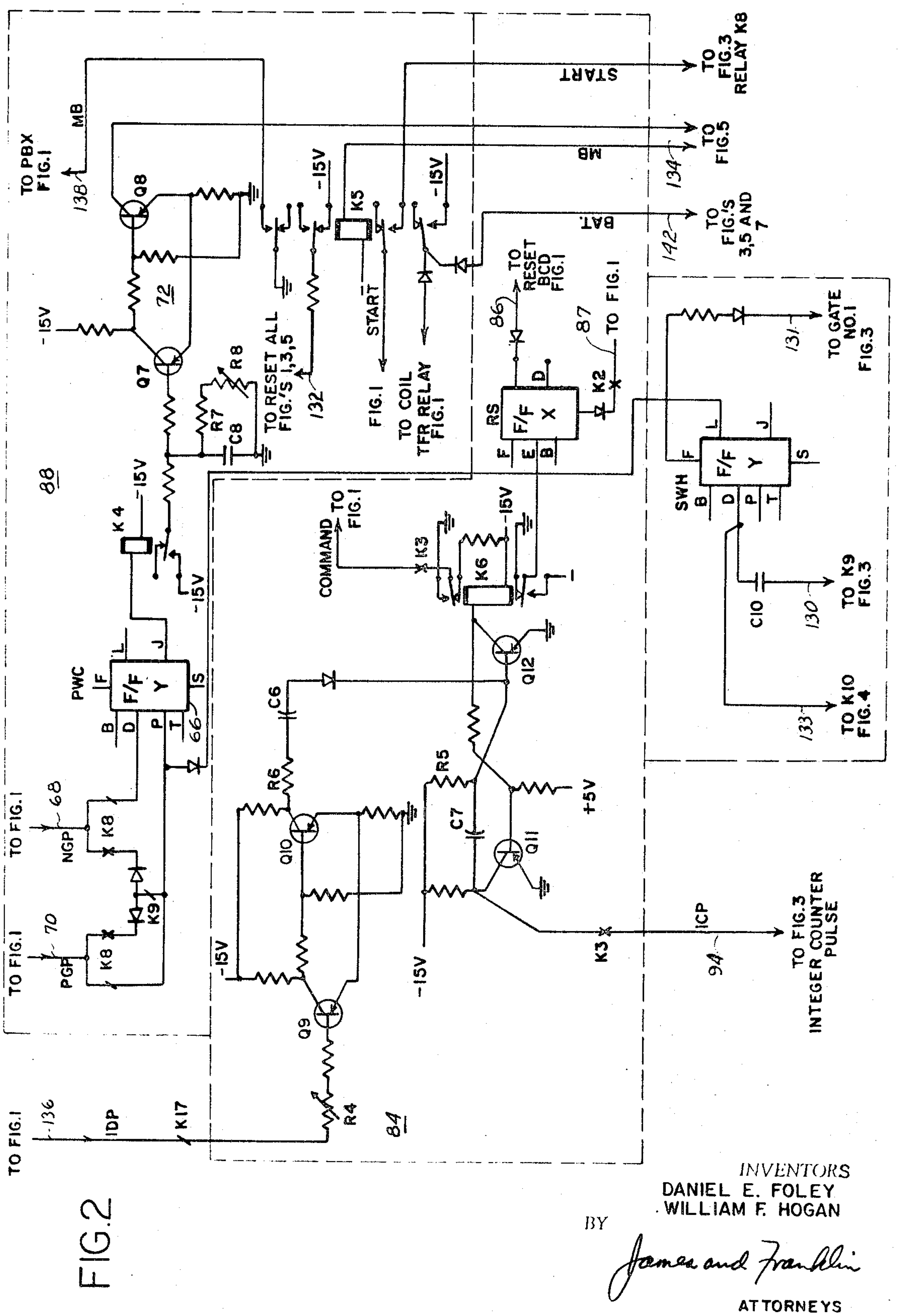
FIG. 2 shows the wiring for off-hook and on-hook sensors and for power control.

The NGP and PGP pulse detectors 48 and 50 are the mainstays of the system. One function of relays K1 and K2 is to control a power control flip-flop (PWC) 66 shown in power control area 88 in FIG. 2. When K1 on line 68 pulses flip-flop PWC 66 it is positioned to "set," causing relay K4 (FIG. 2) to release. This turns on transistor Q7 which turns off transistor Q8, causing relay K5 to release, which applies and maintains power to the circuits, and when pulsed on line 70 by K2 the PWC flip-flop 66 is positioned to "reset" PWC 66 in order to turn power off. A timing circuit at 72 (a Schmitt trigger circuit) is inserted in the power-off side to delay actual turn-off for about 200 milliseconds after the PWC flip-flop 66 has been "reset" to the off position. The delay is sufficient to bridge the grounded signal elements (58 in FIG. 10) of the dial pulses in order to maintain activation during normal signalling operations including dialing and hits etc. When a positive going pulse is not followed by a negative going pulse within about 200 milliseconds, timeout will occur, and the system will turn off. This timing is measured by discharging the capacitor C8 (FIG. 2).

In FIG. 1 a third transistor pulse amplifier (BCD driver) in area 52 is tapped off the bottom plate of condenser C1 and is coupled through capacitor C2 to transistor Q6. The coutput of transistor Q6 drives the DBC encoder in area 74, and the Counter Access flip-flop (CA) in area 76. The output of BCD driver 52 also is a negative-going pulse-detector having the transistor Q6 biased off and driven into conduction momentarily by negative charges on capacitor C2. The only function of the transistor Q6 is to drive flip-flops, hence the pulse can be very sharp. Being receptive to negative going transitions it will pulse the flip-flops on the front end of dial pulses in unison with relay K1 of the "NGP" detector circuit 48.

The binary encoder 74 is stepped pulse-by-pulse from line 78 by a dial signal train, and is set correspondingly in 1, 2, 4, 8 binary coded decimal (BCD) representing the dialed digit. The output is then sent forward to the recording device at 26, e.g. a four level punch tape (or with the aid of a decoder it would be a printer) during the interdigit interval. Following the interdigit pulse the encoder 74 is immediately reset to make ready for the next train of dial signals. (Translation of serial pulse trains produced by the dial to binary members is not mandatory. While arranged as a binary counter for descriptive purposes in this specification the flip-flops maybe arranged as a decade ring counter if that is desirable. In that case discrete outputs for the decimals will be obtained from the decade counter.)

Figure 3:
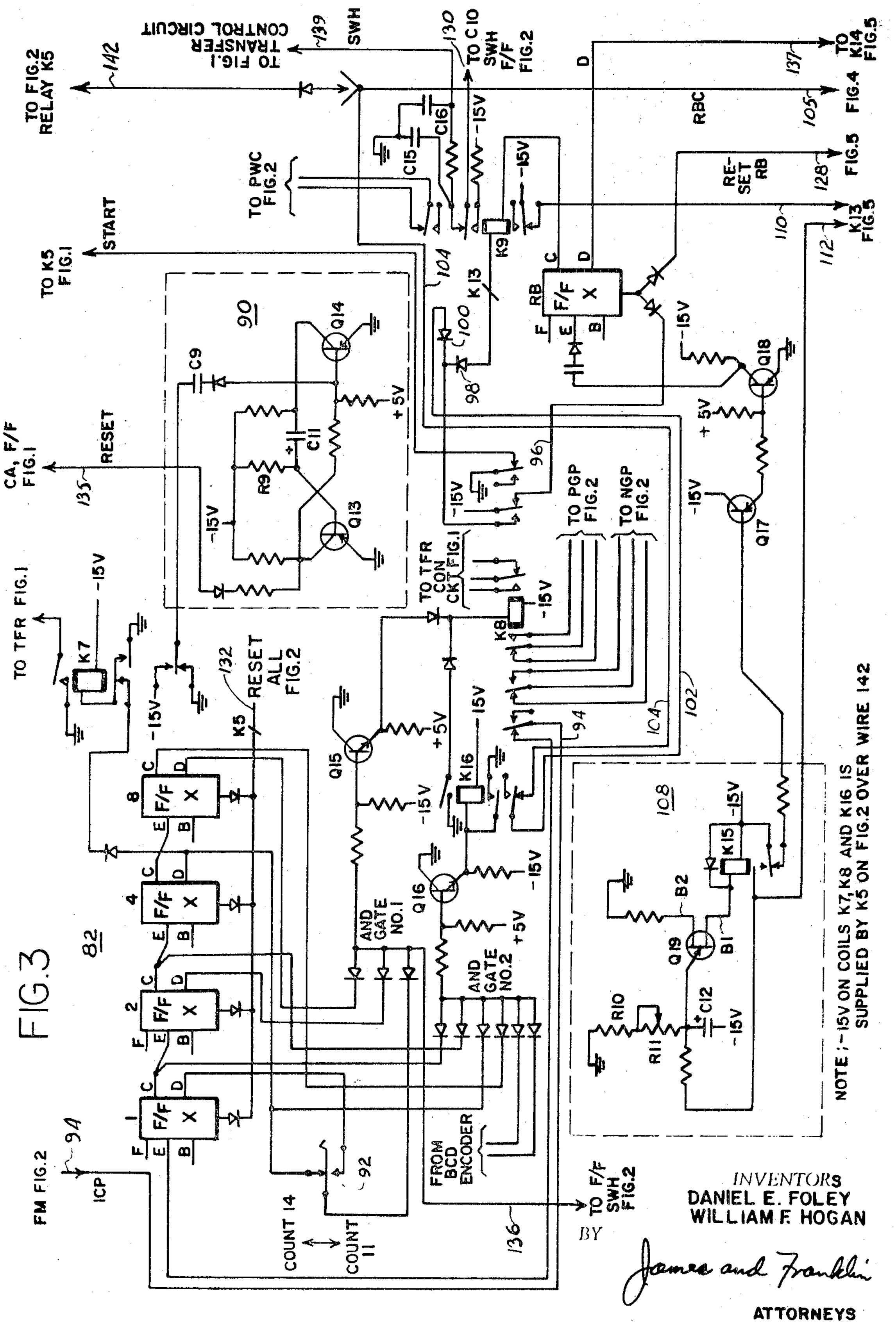
FIG. 3 is a wiring diagram of an integer counter and timing circuit.

The Counter Access flip-flop (CA in area 76), also driven by transistor Q6, performs an inhibit function. Specifically, the conditions are as follows. When an off-hook occurs, wire L of line 38 changes from ground to approximately minus 15 volts due to the closure of the switchhook contacts in the telephone which provide continuity from −48 volts at supply 46, through resistor R1 through the PBX and the telephone set impedance, and back through resistor R2 to ground. Voltage at wire L is the voltage drop across R2 or approximately 15 volts negative. This switchhook transition or "hit" will not get through to drive the recorder (26 in FIG. 11 supplied at 80 in FIG. 1) over the "Command" lead at 80 because the CA flip-flop 76 closes the relay K3 too late. Relay K3 when operated opens its own input to the CA flip-flop, and provides continuity for the "Command" lead and ICP (integer counter pulser) lead on ensuing pulses. During extension number identification the off-hook signal just discussed is powered from local TMDD battery at terminal 46. After dialing the extension number, (in this specification arbitrarily assumed to be a four digit number) the TFR relay 32 operates and a hit condition occurs, powered by the Telephone Company battery. Referring to FIG. 3 an integer counter at 82 provides a reset for the CA flip-flop (at 76 in FIG. 1) at this point so that it again prevents the line hit from reaching the recorder over 80 where it would appear as an extraneous character.

A second set of contacts of relay K1 (FIG. 1) drives the IDP (interdigit pulser) in area 84 in FIG. 2. The IDP circuit 84 consists of a timed Schmitt trigger circuit and a one-shot multivibrator. In the idle condition transistor Q9 of the Schmitt trigger is off and transistor Q10 conducts. The one-shot has transistor Q11 off and Q12 on, with the collector of the latter transistor holding relay K6 energized. On a negative-going line-transition the relay K1 (FIG. 1) releases momentarily as previously noted. This operation applies negative battery to the base of transistor Q9 (FIG. 2) turning it on, and it in turn driving Q10 off. When repeated operations of relay K1 are systemic and within time limits specified for dial pulse signals the RC network (R3 and C5) across relay K1 contacts, is adequate to hold Q9 on during transitions in the signal train. Therefore Q10 remains off during a dial run down or return rotation. When the interval between transitions exceeds a dial pulse element by 20 percent, (60 milliseconds overall instead of 50) the lower plate of condenser C5 will turn sufficiently positive to block the conduction of transistor Q9 which turns off, causing transistor Q10 to turn on. The resulting pulse created at the collector of Q10 is differentiated by condenser C6 and drives the one-shot into action by pulsing Q12 off, thereby releasing relay K6, which grounds the "Command" lead to the Recorder. The conventional one-shot action takes place to reoperate relay K6 by transistor Q12, returning to "on" as determined by the RC constants C7 and R5.

The width of the output pulse of the one-shot can be adjusted to match the recorder requirements. In this case the pulse width is made to be approximately 25 milliseconds. The total interdigit time in this case is made 35 milliseconds to effect the recording of the digit just transmitted. The 35 milliseconds is arrived at as 10 milliseconds in excess of a normal dial signal unit to operate the Schmitt trigger, and 25 milliseconds for the "Command" or readout pulse used up by the one-shot. Since with manual dialing the normal interdigit delay runs much more, say from 200 to 500 milliseconds, there is plenty of margin in which to record and reset without a buffer. Following the interdigit pulser through one more step finds relay K6 setting flip-flop RS when it reoperates on the back end of the one-shot output pulse. When set, the RS flip-flop resets the BCD end encoder (74 in FIG. 1) over the reset BCD lead 86. The RS flip-flop (FIG. 2) must be reset, however, before the BCD encoder 74 (FIG. 1) can respond to the next pulse train. The RS flip-flop is reset over wire 87 on the first transition of a line signal, which in this case is the beginning of another train of dial pulses. The first transition will be positive going (like 54 in FIG. 10), thus K2 (FIG. 1) will be pulsed and will reset the RS flip-flop over wire 87. Since the BCD encoder 74 (FIG. 1) is pulsed by transistor Q6 of BCD driver 52 on negative going line transitions, (back end of dial pulse) the encoder 74 is enabled in plenty of time to receive the first pulse of the next digit.

From the above it will be understood that there is a sequence of properly timed circuit operations taking place to prepare, encode, and pulse out the dialed number, integer by integer. In addition, provision is made to count the integers during the process, and this will be described next. The integers are first counted to determine completion of the extension identification (in this case four digits), and are next counted to determine completion of the called number.

Another output pulse is taken from the one-shot of interdigit pulser 84 (FIG. 2) to drive the integer counter 82 (FIG. 3) via wire 94 (FIG. 2). The collector of transistor Q11 (FIG. 2) is used for this drive pulse. It drives the integer counter 82 (FIG. 3) which is a binary counter similar to the BCD encoder 74 in FIG. 1, on each interdigit delay. The integer counter keeps track of the number of integers dialed, and triggers some functions along the way. Reset voltage on wire 132 is removed from the flip-flops of the integer counter 82 when relay K5 in FIG. 2 in the power control circuit of area 88 operates in response to "off-hook." Following the operation of relay K3 of counter access circuit 76 (FIG. 1) on the first negative going pulse after the off-hook hit as previously described, lead 94 from the interdigit pulser 84 (FIG. 2) to the integer counter 82 (FIG. 3) is closed and will carry a pulse on each interdigit timeout to drive the integer counter 82.

As here illustrated the station extension number is assumed to be a four digit number. Upon dialing the four digit number of the calling extension the integer counter (82 in FIG. 3) produces an output on flip-flop 4 of the binary counter 82, corresponding to a count of four, thereby operating relay K7, which locks to ground through its bottom make-break contacts. Relay K7 operates TFR relay 32 (FIG. 1). Operation of TFR relay 32 will signify completion of the identification of the calling extension, and connects the extension to the telephone line 44 (FIG. 1). This incidentally causes a line hit similar to that discussed for "off-hook." It is necessary therefore to reset the flip-flop of counter access 76 for reasons already covered. Relay K7 pulses the "One-shot booster" in box 90 (FIG. 3) which in turn resets the flip-flop CA of area 76 (FIG. 1) via wire 135.

At this point the caller listens in the usual way for a dial tone. Upon receipt of dial tone, he resumes dialing, and the integer counter moves forward on interdigit pulses. The next switch will come when the complete number is dialed (after either 11 or 14 integers). At that point AND gate No. 1 (FIG. 3) provides a means to recognize end-of-dialing by having the outputs of the integer counter connected to the AND gate inputs. In the FIG. 3 arrangement the AND gate will cause transistor Q15 to turn on when 14 digits have been dialed. This figure assumes the following:

| | Digits |
|---|---|
| Extension number | 4 |
| Area code | 3 |
| Called Station | 7 |
| Total | 14 |

A count switch is provided at 92 (FIG. 3) for convenience when the telephone line is used to call both local and toll, the local calls completing on a total of 11 instead of 14 digits. This change can be controlled remotely, typically at the extension itself if desired, by additional circuitry.

Each digit has been recorded as it was completed, and now both the calling extension and the called number have been recorded.

When Q15 (FIG. 3) turns on, coincident with completion of the last digit dialed, it operates relay K8. Relay K8 is a multicontact relay which prepares circuitry for call completion and call timing. A set of break contacts on the extreme left opens integer counter pulser (ICP) lead 94 to prevent further count by the counters, thereby insuring that relay K8 remains energized. A set of break contacts on the extreme right of relay K8 removes ground from the recorder START lead (at top of FIG. 3 and connecting to group 80 in FIG. 1) thereby deenergizing and stopping the recorder. The center set of contacts on the right of relay K8 (FIG. 3) is a transfer that removes negative battery from flip-flop (RB) reset lead 96, and applies battery through diode 98 to operate relay K9 (FIG. 3) and through diode 100, wire 102 and bottom contacts of relay K16, thence through wire 104 and RBC lead 105 (bottom of FIG. 3 to top of FIG. 4) to operate a relay K10 which is on FIG. 4.

Figure 4:
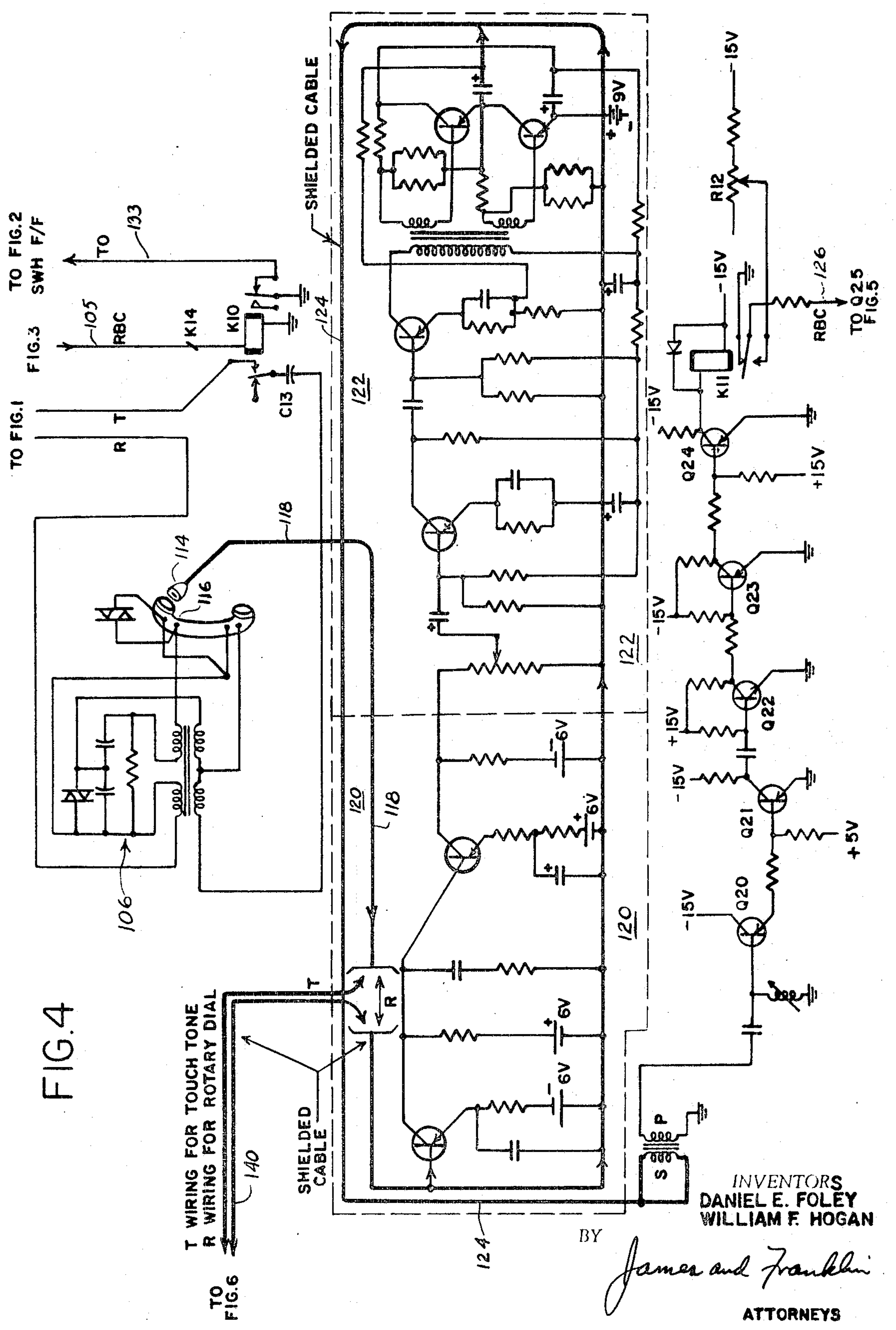
FIG. 4 shows a ringback deter detector.

Relay K10 when operated connects to a ringback detector shown in FIG. 4. More specifically it connects an LC coupling made up of a telephone receiver network 106 (FIG. 4) for the inductor and condenser C13, across the T and R leads of the telephone line (via H and L leads 38 to relay 32, and thence to telephone line 44). The ringback detector (FIG. 4) is now in position to repeat ringback 20 cycle current by inductive means described later. (Ringing is at 20 cycles).

The main purpose of relay K9 (shown in FIG. 3 and repeated in FIG. 2 in detached contact schematic symbols) is to deactivate the "go" or negative going pulse (NGP) and "No Go" or positive going pulse (PGP) leads for a desired time, say 5 seconds, to prevent a premature cutoff. When the telephone company switching equipment picks up the line following receipt of the last digit there are a number of hits generated. Since these hits are highly irregular, and transients thus created are amplified by line capacitance, a false positive-going pulse can very likely be sustained, causing a premature cutoff. power control immunity is therefore provided during switching, and starts with the operation of relay K8 (FIG. 3), and the two sets of transfer contacts on the left in FIG. 3 are repeated in the Power Control Circuit of FIG. 2, but in detached contact schematic symbols. The go and no go leads 70 and 68 at the top of FIG. 2 are joined by operation of relay K8 and are connected to the PWC flip-flop 66 by normally closed contacts of relay K9, which is energized for the 5 seconds.

The purpose of combining the "go" and "no go" leads into one "no go" lead by the operation of relay K8 is a safeguard against failure to recognize on-hook after the 5 seconds safety period have expired. Hits generated by telephone company equipment on call disconnect, produce another array of unpredicatable transients and can cause masking of the on-hook or positive going pulse required for restoration to idle condition. Therefore, following the 5 second delay and the series of hits caused by call switching during that delay period to which the PWC flip-flop (66 in FIG. 2) is made immune by the 5 second operation of relay K9, all DC hits thereafter should be associated with call disconnect, and these hits are therefore interpreted as "no go" (turnoff signals) whether they be NGP or PGP signals.

Relay K9 (FIG. 3), which is cycled to provide the "immunity" interval, controlled by a Unijunction Time Delay Circuit (box 108 in FIG. 3), or by receipt of the first ringback signal, whichever occurs first. When ringback occurs there will be no further switching hits for connection, and no further delay is needed. When K9 is first operated, it removes negative battery (via leads 110 and 112 to relay K 13 normally closed contacts shown in FIG. 5) from the timing condenser C12 in the Unijunction Time Delay Circuit 108 (FIG. 3), and condenser C12 starts to charge. In 5 seconds the emitter of the Unijunction is sufficiently positive with respect to the B1 and B2 junction (box 108) to fire the Unijunction operating relay K15 momentarily. The normally open contacts of relay K15 discharge condenser C12 and charging starts over again. Operation of relay K15 also pulses off transistor Q17, which pulses off transistor Q18. The output of transistor Q18 pulse sets flip-flop RB. The C output of RB flip-flop turns negative, releasing relay K9 to end the "immunity" interval. Relay K9 when released connects the NGP (negative going and PGP (positive going pulse) leads 68 and 70 (FIG. 2) (combined by then operated relay K8) to the P lead of flip-flop PWC 66. Power control is now arranged to go off on hits generated during disconnect or on-hook. Relay K9 when released also disables the Unijunction timer (108 in FIG. 3) by restoring negative battery to capacitor C12. (This assumes K13 unoperated, in contrast with K13 operated which signifies ringback.)

Returning to relay K8, (FIG. 3) the first set of transfer contacts on the right (as shown in detail in FIG. 3, and shown in detached contact schematic form in FIG. 1) swings the RC couplers 42 and 44 (FIG. 1) from the L to the H lead 38. This is a safeguard against both false cutoff and false tieup. There is usually a cinsiderably drop in central office voltage after the switcher picks up the call in the central office. The voltage may fall off enough to look like a positive-going-pulse to the detector. By transferring over to the H lead the voltage to ground at the RC coupled point remains about the same during telephone company switching and after call establishment, as it was during dialing mode. Another advantage of the transfer is the fact that the RC couplers 42 and 44 are more responsive to disconnect hits since return to on-hook by the calling station cannot ground off the point of connection as it does on the L lead. This condition ensures positive turnoff by the hits when the line terminal is restored to idle condition by the central telephone office.

The operation and release of relay K9 (FIG. 3) has just been covered for a case where ringback occurs later than 5 seconds after completion of dialing. Receipt of a ringback even before 5 seconds will arbitrarily restore relay K9 to off, restart the timing cycle, reset the RB flip-flop, and prepare for action on the absence of ringing, which condition in this apparatus signifies an answerback.

For convenience the 5 second timeout discussed has been used for both the "immunity" interval and the "answerback" interval. In practice a 5 "immunity" interval may not be sufficient to escape switcher hits. The "immunity" interval can be increased by adding a resistor to the RC constant of Unijunction Time Delay Circuit (108 in FIG. 3) and arranging to short this resistor upon receipt of the first ringback signal burst, such as by contact closure on relay K13 in FIG. 5. As a result the "immunity" interval can be lengthened as much as necessary with the answerback interval thereafter returning to 5 seconds upon receipt of ringback, with both intervals derived from the same timing circuit. This arrangement will be more apparent from the description of ringback operations that follows.

Figure 5:
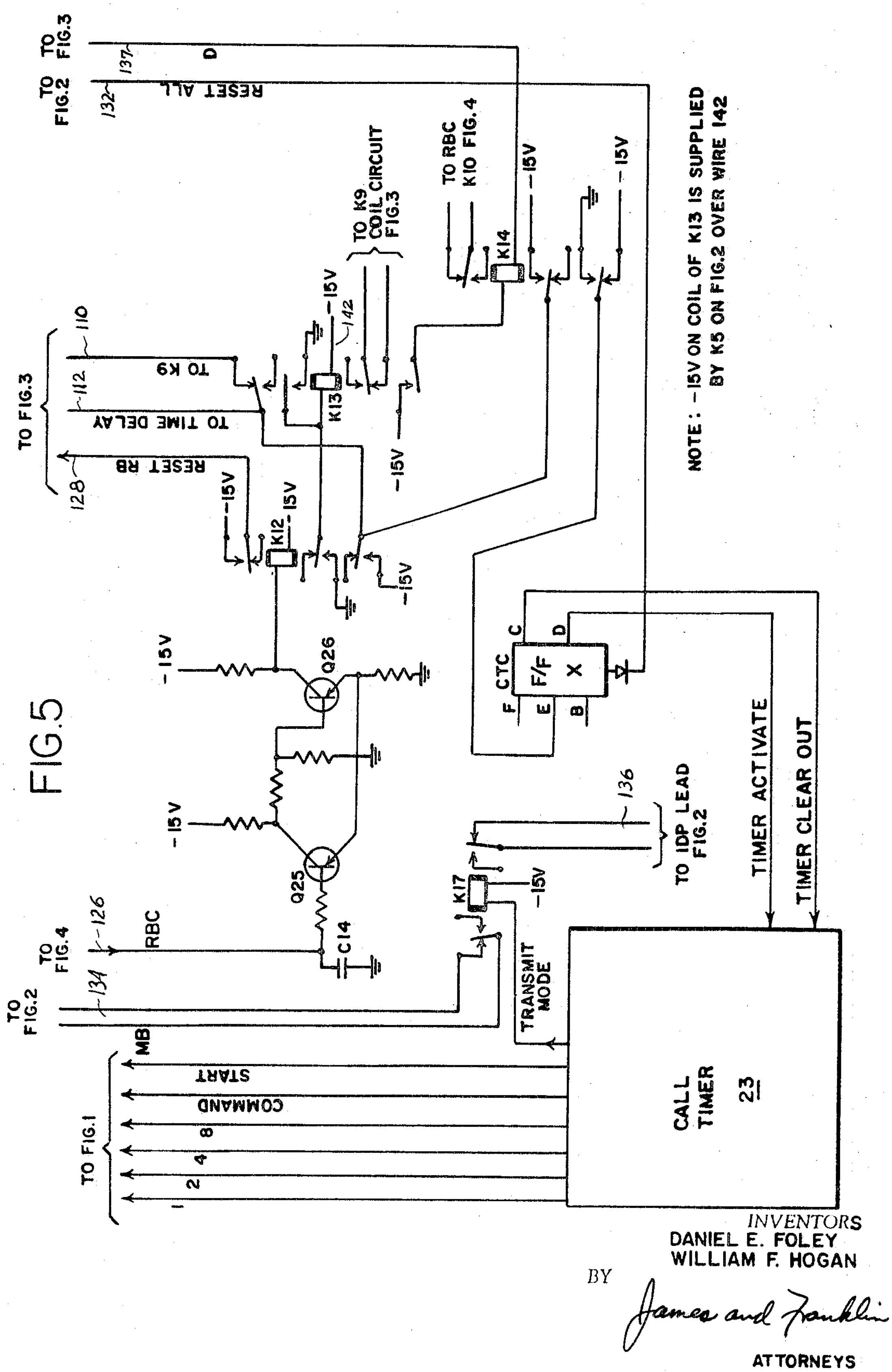
FIG. 5 shows additional wiring for answerback and for controlling a call timer.

As previously noted, ringback detection circuitry was enabled, following end-of-dialing mode at which time relay K8 (FIG. 3) was operated via wire 105 to in turn operate relay K10 (FIG. 4) via normally closed contacts of relay K14 (FIG. 5). Relay K10 (FIG. 4 when operated connects a telephone receiver and typical repeat coil network across the telephone line through condenser C13 (FIG. 4). The telephone receiving equipment is ungrounded and is receptive to transformer induced signals such as ringback current. A telephone pickup coil 114 is placed near the electromagnets of a telephone receiver 116. This is shown as a conventional telephone handset, but the rest of the handset is removed or is inoperative. When first connected the ringback detector hears nothing except possibly a few clicks caused by switching hits. When the ringing of the called station starts, however, a 20 cycle tone is induced into the pickup coil 114, which repeats low level 20 cycle signals via shielded cable 118, to the input of a typical commercially available preamplifier in box 120 (FIG. 4) with low frequency compensation or with filter action to cut off the audio frequencies, in order to be responsive primarily to the 20 cycle ringing frequency. A band pass filter tuned to 20 cycles also may be used.

These signals are amplified in a typical commercially available audio amplifier (in box 122) and fed via a shielded cable 124 into a converter and squaring circuit shown along the bottom of FIG. 4, with the result that relay K11 releases and remains released while ringing current is being received. Relay K11 when released applies negative battery from the potentiometer R12 over RBC lead 126 to capacitor C14 (FIG. 5) to charge this capacitor. Capacitor C14 will charge to a voltage sufficient to turn on transistor Q25 in a time interval controlled by potentiometer R12 (FIG. 4). In standard telephone practice ringing current is on for 2 seconds and off for 4 seconds. The setting of potentiometer R12 provides a means to identify bona fide ring current by delaying turn-on of transistor Q25. Should there be noise it is highly unlikely that noise duplicating a 20 cycle wave shape would exist continuously for even a small fraction of a second. By requiring a continuous release of relay K11 for a short time, say one-half second, for voltage to build up on capacitor C14, operation by noise is prevented. Greater delay is undesirable because the called station may happen to answer after a momentary or fractional first ring.

When transistor Q25 (FIG. 5) is turned on it will turn off transistor Q26, and relay K12 releases. Relay K12 will be released for the remainder of the 2 second ringing interval and will repeat this action on each 2 second ringing cycle. Relay K12 when released operates relay K13 which locks through its own contacts. Relay K12 also applies negative battery over Time Delay lead 112 to stop the timing action of the Unijunction Timer 108 (FIG. 3). This resets the unijunction Timer 108, which will begin a new cycle when K12 reoperates at the end of the 2 second ringing interval. In this way the Unijunction Timer 108 gets reset after every 4 seconds nonringing after each burst of ringback tone, thus starting a new timing cycle. When the call is answered the bursts of tone stop, and the Unijunction Timer is permitted to time out its 5 second cycle. Timing out after ringback provides the desired answerback notification.

Relay K12 (FIG. 5) when released by ringback signals, also serves to reset flip-flop RB (FIG. 3) over wire 128. Relay K13 (FIG. 5) having been operated by relay K12 as noted, locks up through its own holding contacts and provides for inhibiting relay K9 (FIG. 3) against further operations of the RB flip-flop, and removes negative battery supplied by relay K9 over wire 110 to Unijunction Time Delay Circuit 108. The bottom contacts of relay K13 (FIG. 5) provide an operating circuit for relay K14 which will operate on answerback (cessation of ringback). Now with relay K13 up, and with the RB flip-flop reset and relay K12 reoperated at the end of the 2 second ring interval, all preparations are complete for answerback. The next timeout of the Unijunction Timer 108 (FIG. 3) will be caused by cessation of ringing. When timeout occurs the RB flip-flop (FIG. 3) will again be set by transistor Q18 output pulse, causing the D output of the RB flip-flop to turn from negative to ground, and thus provides an operating path via wire 137 for relay K14 (FIG. 5). Relay K14 when operated drops relay K10 (FIG. 4), thereby disconnecting the Ringback Detector. Relay K14 also provides negative battery over wire 112 to disable the Unijunction Timer 108 (FIG. 3) and sets Call Timer Control flip-flop (CTC) (FIG. 5) which in turn activates the Call Timer 23.

The TMDD is now in its holding mode, and no further action is required until disconnect or on-hook. Before discussing disconnect functions, the purpose of SWH flip-flop (FIG. 2) will be explained. If a caller changes his mind and abandons his call after dialing and before the immunity period is expired and/or before ringback, the apparatus might remain energized instead of responding to on-hook. It will be recalled that at the completion of dialing when relays K8 (FIG. 3) and K9 operate, the power control function is disabled for 5 seconds since the NGP and PGP circuits are open, as previously described. At that time the PWC flip-flop 66 (FIG. 2) is in the "go" mode and will stay that way through the switching hits. Should the calling station abandon the call between dial completion and release of relay K9 (either by ringback signals or by the Unijunction Time Delay timeout 5 second interval) the on-hook signal will be missed. The SWH flip-flop (FIG. 2) prevents a TMDD tieup as a result of such early call abandonment.

To do this, while relay K9 is operated (FIG. 3) a set of transfer contacts is applying negative (reference) voltage over SWH lead 130 (FIGS. 3 and 2) to condenser C10 of SWH flip-flop input D, (FIG. 2). Ground on the D input has been removed with the operation of relay K10 (FIG. 4) which occurs coincident with dial completion when relays K8 (FIG. 4) and K9 operate. Flip-flop SWH reset lead F has had negative reset battery removed at this same time by virtue of all inputs to AND Gate No. 1 (FIG. 3) turning off. When relay K9 is released by the expiration of the 5 second interval (there being no ringback in the early abandonment situation now being considered) it transfers the charged condenser C10 to the L lead of the pair 38 via wire 139 on the Transfer Control Circuit 30 (FIG. 1).

If the calling station has returned to on-hook the L lead (FIG. 1) will be at ground potential. In this event capacitor C10 (FIG. 2) will discharge and set flip-flop SWH, turning the L output of the flip-flop negative, which in turn drives PWC flip-flop to turn its J output negative, thereby releasing relay K4, which in turn reoperates relay K5, and shuts off the power and idles the TMDD as previously described. When the calling station remains on the call, the L lead is negative, and of roughly the same value as the reference negative charge applied to capacitor C10. When capacitor C10 is transferred back to the L lead by release of relay K9 (FIG. 3) and finds negative battery thereon, no action takes place in the SWH flip-flop (FIG. 2), hence no turnoff follows. The RC network (FIG. 3) consisting of capacitors C15, C16 and a 10K resistor on relay K9 contacts, is desirable to suppress spikes and unbalances that may result from nominal differences in charging and reference voltages.

A means to permit dialing for "operator assistance" on outgoing calls is another feature of the TMDD. Referring to FIG. 3, the AND gate No. 2, the transistor Q16, and the relay K16 are the components of the operator assistance circuit. If after dialing the extension number and getting a dial tone, a zero is dialed to call the operator, all inputs to AND gate No. 2 will be off. This action turns on Q16 (FIG. 3) causing relay K16 to operate. Relay K16 is locked through its contacts, and operates relay K8 and opens the RBC lead over wires 102, 104 and 105 to prevent activation of the ringback detector (FIG. 4). Relay K8 (FIG. 3) when operated, positions the power control circuitry to scan for disconnect hits in the routine way previously described, and upon receipt of disconnect hits, the TMDD will be restored without an attempt at call timer data transmission. Since one function of relay K8 is to stop the recorder, as previously described, there will be no further recording than the extension number and zero.

Upon call completion (disconnect), DC hits will be generated both by the station's on-hook operation and by central office operations. The power control sensors have been pointed to "no go" by relays K8 and K9 as previously explained, so that either NGP or PGP response, or both, will produce a turnoff action or idling, reoperating relay K5 (FIG. 2). Assuming the Call Timer 23 (FIG. 5) to have been activated on answerback as previously described, the negative voltage applied by relay K5 (FIG. 2) over "Reset All" lead 132 to flip-flop CTC on FIG. 5 which occurs when PWC circuit (FIG. 2) responds to disconnect, will reset flip-flop CTC (FIG. 5) thereby grounding its output C, which will be interpreted as a Timer Clearout signal. The Call Timer 23 will then go into "Timer Transmission" mode by first operating relay K17 (FIG. 5). Relay K17 when operated reactivates the TMDD by opening the make-busy leads 134 to K5 relay (FIG. 2) thereby dropping relay K5, whereupon the make-busy is reestablished to preempt the line while the transmission of the timer data is in progress.

As a precautionary measure relay K17 (FIG. 5) when operated also opens the IDP lead 136 (FIG. 2), so that no interference to the recorder can result from someone overriding the "busy," as by a PBX operator mistakenly inserting a plug despite a busy light on the switchboard. When the Call Timer 23 finishes its transmission it drops relay K17 and the TMDD is restored to its idle line standby condition. Since relay K5 (FIG. 2) must first be operated by a disconnect in order to activate Timer Clearout via the action of the CTC flop-flop, all of the locked in devices such as relay K13 (FIG. 5) are released when the Call Timer 23 "transmit" mode reestablishes the "make-busy" over wire 138 (FIGS. 1 and 2) which runs directly to the PBX subscriber line terminal equipment, as will be understood by those familiar with standard telephone practice. This interval is made a matter of only milliseconds in order to safeguard the line against subscriber pickup during an unguarded period. Should such a pickup occur, however, the subscriber signals are inhibited by the open IDP lead 136 FIGS. 1 and 2), and this is true even if the interval is a longer one.

To summarize, the caller cannot get the flat rate line until he dials his extension number, which is recorded. He then gets the line and dials the called number, which is also recorded. On answerback the call timer is started. At the end of the call, the timer is stopped and the two times are recorded, or the elapsed time is recorded, depending on the nature of the timer. The date may also be recorded if an appropriate timer is used. The idle condition is then reestablished.

MODIFICATION FOR PUSHBUTTON DIALING

The apparatus as so far described assumes that the dial is a rotary dial which transmits DC pulses. The device may be modified to take care of pushbutton or "Touch-Tone" dialing. This will be described with reference to FIGS. 6 and 7.

The present "Touch-tone" modification makes use of a parallel wire data receiver set described in a publication called "Bell Telephone Laboratories Record," Volume 40, No. 3, dated Mar. 1962 in an article entitled "A Low-speed Data Set for High-Speed Business." This set employs a modified FM transmission system and is compatible with the dual frequencies generated by a "TouchTone" dialer. A further description of the data receiver is contained in U.S. Pat. No. 3,327,060 of W.F. Hogan, entitled "Alarm System Using Telephone Exchange and Automatic Dialer for Transmission of Tone Frequencies." Since the technique of data transmission by combinations of tone frequencies in a 2-out-of-8 code is known to the art, the principles will not be detailed here.

A standard "Touch-Tone" telephone set is described in an article published in the Feb. 1968 issue of "Electronics World" entitled "Ring Two for Tomorrow." The "Touch-Tone" calling system replaces calling system replaces the DC dial pulses with pairs of audio tones, one pair for each digit, generated by pushbuttons. The filters in the parallel wire data receiver previously mentioned separate the two tones and present them to an interface in the form of contact closures. The circuitry shown here in FIGS. 6 and 7 translates the output of the data set to BCD (binary coded decimal) code for the TMDD recording. It assumes that the data receiver has an output using relays. In later production a "solid-state" data receiver with voltage interface output would be preferred, and would simplify the translation circuits shown in FIGS. 6 and 7. Such sets are already known, but we know of no present publication of the same for reference purposes.

Referring to FIG. 6A the rectangular drawing under the title "Pushbutton Assignment" represents the pushbuttons on the telephone. The buttons are arranged in a four by three matrix, with two of the buttons in row four missing. One tone frequency is assigned to each row of buttons, and one tone frequency is assigned to each column of buttons, as indicated on the drawing. When a button is pushed it generates a two tone audio frequency, one tone corresponding to the row frequency, and the other tone corresponding to the column frequency. For example, assume 700 cycles assigned to row 1 and 1200 cycles assigned to column 1. Depressing button 1 will cause these two frequencies to go out on the line for as long as the button is held down. The parallel wire data receiver set is connected by the T ("Touch-Tone") wiring shown in FIG. 4, instead of the R (Rotary) jumper, the line 140 being a shielded cable which is connected in series in the line 118. The data receiver, schematically shown in FIG. 6, filters these two frequencies, and in this case presents contact closures on outputs A1 and B1. The closures will persist for as long as the tones are generated by the depressed button. As the "Touch-Tone" dial frequencies are being transmitted to the central office over the line (44 in FIG. 1) they are fed to the data receiver (FIG. 6) of the TMDD by telephone pickup coil 114 (FIG. 4) previously described in connection with ringback detection. The pickup coil 114 continues to handle ringback as well as the dialing tones in this arrangement. The ringback frequency being 20 cycles, and the dial tone frequencies running between 700 and 1500 cycles (see FIG. 6A), the two AC signal categories are well separated and present no detection problem when fed from the same pickup coil 114 (FIG. 4).

With dial signals created by discrete audio tones the recording will not be interfered with by switcher hits. It is therefore feasible as well as necessary to immediately connect the pickup coil 114 in response to off-hook, and this is done by wiring as shown at RBC lead 142 (FIGS. 2 and 3) to a battery supply. The other features and precautions built into TMDD and already described are retained in order to prevent premature turn off, and failure to turn off. The same pickup coil 114 in (FIG. 4) deactivate arrangement is retained, that is, the ringback detector is disconnected upon receipt of answer-back, as before.

The translation of dial tone signals involves pairing the contact outputs of the parallel wire data set so as to first obtain a discrete output for each digit (0 to 9) and then encoding these to BCD via a diode matrix shown in FIG. 7. Thus, the pushbutton spurts of tone are concerted to on-off signals over the BCD (1, 2, 4, 8) drivers to the recorder. In FIG. 6 the A1 to A4 contacts and the B1 to B3 contacts of the data set output each turn on an individual transistor upon closure. The transistors are off while the contacts are open. Therefore all transistors will be off between tone bursts (digits), an interval previously referred to as interdigit delay. The collector outputs of these transistors are designated as TONE 1, TONE 2, etc., to correlate with TONE PAD (FIG. 6A) assignments. Contacts A1 through A4 represent the row frequencies, and contacts B1 through B3 represent the column frequencies.

Specifically, if pushbutton 1 were depressed, tones 1 and 5 would be transmitted, and when filtered by the data receiver (FIG. 6), contact closures would obtain on A1 and B1 causing corresponding transistors to turn on. The collectors of the transistors feeding leads TONE 1 and TONE 5 will now be at ground instead of negative. Tracing these leads to Sheet 7, each one forms a vertical bus at the left end of FIG. 7 that feeds the input of a number of two-input "AND" gates. In this example, TONE 1 and TONE 5 are inputs to the AND gate for the digit 1- (second emitter - follower from bottom), and with ground on both inputs to this gate, the emitter-follower is forward biased and turns on. This condition changes the output from negative to ground. Other gates with inputs connected to TONE 1 bus or TONE 5 bus remain negative from the other associated input which is fed from a different bus. etc., The emitter-follower output for Digit 1 going grounded, it grounds BCD encoder vertical bus 1 at the right hand part of FIG. 7, thereby providing the same condition for "on" as previously produced by the binary counter in the DC rotary dial arrangement. Emitter-followers for the other digits that select vertical bus 1 have their connecting diodes back-biased and are unaffected. The horizontal bus for each digit input to the matrix is also diode connected to a vertical bus marked "-command." This is the "read" signal for the recorder and will occur in unison with the grounded binary (1, 2, 4, 8) bus vertical or verticals during reception of the decoded tone signal. The command bus furnishes the command pulse and the Integer Counter Pulse by the operation of relay K18 (FIG. 17).

For a more detailed description reference may be made to the above mentioned U.S. Pat. No. 3,327,060, and if desired to the above mentioned publications.

In respect to connections at the lower right hand corner FIG. 7, and referring to FIG. 2, for "Touch-Tone" operation, the command lead shown at relay K6 in FIG. 2 should be disconnected and left open-circuited. The ICP lead at Q11 in FIG. 2 should be disconnected from Q11 and should be connected instead to the ICP lead on FIG. 7. This is in addition to the change at the upper left part of FIG. 4 previously mentioned.

Resistors and capacitors that are significant in the timing and pulsing functions carry reference characters in the drawings. Other components are typical in value and require no detailed description, because they would be known to those versed in such circuitry. In a particular case the components with reference characters had values as follows:

| Drawing | Location | Component | Value |
|---|---|---|---|
| Fig. 1 | Relay 32 | Resistors R1 and R2. | Variable from 0 to 1,500 ohms. |
| | Relay K1 | Resistor R3 | 300 ohms. |
| Fig. 2 | Transistor Q9 | Resistor R4 | Variable from 0 to 10k. |
| | Transistor Q12 | Resistor R5 | 57k. |
| | Transistor Q10 | Resistor R6 | 22k. |
| | Capacitor C8 | Resistor R7 | 25k. |
| | Capacitor C8 | Resistor R8 | Variable from 0 to 25k. |
| Fig. 3 | Transistor Q13 | Resistor R9 | 50k. |
| | Transistor Q19 | Resistor R10 | 6.2k. |
| | Transistor Q19 | Resistor R11 | Variable from 0 to 25k. |
| Fig. 4 | Relay K11 | Resistor R12 | Variable from 0 to 150k. |
| Fig. 1 | Transistor Q1 | Capacitor C1 | 2.0 $\mu$f. |
| | Transistor Q6 | Capacitor C2 | 0.01 $\mu$f. |
| | Transistor Q3 | Capacitor C3 | 1.0 $\mu$f. |
| | Transistor Q4 | Capacitor C4 | 1.0 $\mu$f. |
| | Relay K1 | Capacitor C5 | 2.0 $\mu$f. |
| Fig. 2 | Transistor Q10 | Capacitor C6 | 0.01 $\mu$f. |
| | Transistor Q11 | Capacitor C7 | 1.0 $\mu$f. |
| | Transistor Q7 | Capacitor C8 | 60 $\mu$f. |
| | Flip-flop SWH | Capacitor C10 | 0.01 $\mu$f. |
| Fig. 3 | Transistor Q14 | Capacitor C9 | 0.01 $\mu$f. |
| | Transistor Q13 | Capacitor C11 | 90 $\mu$f. |
| | Transistor Q19 | Capacitor C12 | 250 $\mu$f. |
| | Relay K9 | Capacitor C15 | 0.05 $\mu$f. |
| | Relay K9 | Capacitor C16 | 0.001 $\mu$f. |
| Fig. 4 | Relay K10 | Capacitor C13 | 0.5 $\mu$f. |
| Fig. 5 | Transistor Q25 | Capacitor C14 | 10 $\mu$f. |

The relays TFR, K3, K5, K7, K8, K9, K12, K13, K14 and K16 were Potter and Brumfield KHP series relays, or equivalent. The relay K15 was a Sigma type Blue Post relay having a 50 ohm coil, or equivalent. All other relays were Sigma type 22 RJ series, or equivalent.

All of the PNP transistors were Type 2N651, or equivalent. All of the NPN transistors were type 2 N1304, or equivalent. All of the diodes were Type 1 N482, or equivalent.

It will be understood that these specific quantitative values of components have been given solely by way of illustration and are not intended to be in limitation of the invention.

The circuits shown in FIGS. 8 and 9 correspond to typical bistable multivibrators, commonly called flip-flops. They are commercially available.

Quantitative values need not be given for the "Touch-Tone" circuits shown in FIGS. 6 and 7, the components all having typical values which will be understood by those skilled in the art.

In FIG. 1 the PBX may be omitted, that is, multiple extensions A, B. C. etc. may be connected directly to the terminal strip 28. In simplest form there could be a single telephone connected to the terminal strip.

The device does not repeat voice signals, and therefore cannot be used as a wire tap, and cannot be used to monitor the conversation itself.

It is believed that the construction and operation of my improved telephone message data device, as well as the advantages thereof, will be apparent from the foregoing detailed description. In simplest form the device will record the numbers called. In somewhat more elaborate form it will additionally record the hold time or duration of each call. In a more usual form it is applied to a system having multiple extensions any one of which may be connected to the flat rate line, and in such case may further record the identity of the particular extension making each call. If desired, the device may further record the date of the call, and the times that the call started and terminated. It will be understood that while we have shown and described our invention in preferred forms, changes may be made without departing from the scope of the invention. In the claims the word dial refers to either a rotary dial or a pushbutton dial.

We claim:

1. A telephone message data device for use by a subscriber, said data device comprising means for coupling it to the line which coupling means is responsive solely to a changing line voltage, a dial signal detector, a recorder, a sensor driven by the coupling and responsive to off-hook signals in order to connect the calling station to the dial signal detector and to start the recorder, means responsive to the detector to translate and encode the dial signal into a signal compatible with said recorder, means to supply said compatible signal to the recorder, means to then stop the recorder, and means responsive to on-hook signals to restore the data device to idle condition.

2. A telephone message data device as defined in claim 1, in which there is a digit counter, means responsive to a predetermined correct digit count to enable an answer detector, a timing device having an output compatible with the recorder and having means to start and stop the recorder, means responsive to the detector to start said timing device, means responsive to on-hook signals to stop said timing device, and means to supply the output of the timing device including appropriate start and stop signals to the recorder.

3. A telephone message data device as defined in claim 2, in which there are multiple telephone extensions at the subscriber connected to said data device and in which the means to translate and encode dial signals does so for an extension identification signal dialed at the extension telephone dial, and in which the counter counts the digits of the identification signal, and in which a means responsive to a correct identification digit count connects the extension to the telephone line, all prior to translation and encoding and digit counting of the called number, whereby the calling extension and the called number and the output of the timing device are recorded.

4. A telephone message data device as defined in claim 2 in which there is means responsive to dialing for "operator assistance," which means causes the data device to cancel its program except for response to on-hook signals.

5. A telephone message data device as defined in claim 2 in which the answerback detector comprises a circuit responsive to the ringing frequency to act as a ringback detector, and means responsive to absence of ringback for a period longer than the normal interval between rings to indicate answer.

6. A telephone message data device as defined in claim 2, in which additional means are provided to disable the means responsive to on-hook signals for a predetermined delay period in order to prevent premature restoration to idle condition caused by switching hits from switching equipment in the telephone exchange.

7. A telephone message data device as defined in claim 6 in which there is further means which after the expiration of said delay period, makes the means which is responsive to on-hook signals respond to disconnect hits whether positive going or negative going.

8. A telephone message data device as defined in claim 6, in which there is further means which, in the event of abandonment of an already dialed call prior to termination of the delay period intended to prevent premature restoration to idle condition, makes the apparatus responsive to on-hook condition at the calling station after said delay period.

9. A telephone message data device as defined in claim 7, in which there is further means which, in the event of abandonment of an already dialed call prior to termination of the delay period intended to prevent premature restoration to idle condition, makes the apparatus responsive to on-hook condition at the calling station after said delay period.

10. A telephone message data device as defined in claim 3, in which there is a PBX (private branch exchange) which connects said extensions and said data device, and in which means are provided to hold a busy condition at the PBX after on-hook signals for a time sufficient for and during the recording of the output of the timing device.

11. A telephone message data device as defined in claim 1, in which there are multiple telephone extensions at the subscriber connected to said data device and in which the means to translate and encode dial signals does so for an extension identification signal dialed at the extension telephone dial, and in which the counter counts the digits of the identification signal, and in which a means responsive to a correct identification digit count connects the extension to the telephone line all prior to translation and encoding and digit counting of the called number, whereby the calling extension and the called number both are recorded.

12. A telephone message data device as defined in claim 11, in which additional means are provided to disable the means responsive to on-hook signals for a predetermined delay period in order to prevent premature restoration to idle condition caused by switching hits from switching equipment in the telephone exchange.

13. A telephone message data device as defined in claim 12, in which there is further means which after the expiration of said delay period, makes the means which is responsive to on-hook signals respond to disconnect hits whether positive going or negative going.

14. A telephone message data device as defined in claim 3, in which there is means responsive to dialing for "operator assistance," which means causes the data device to cancel its program except for response on-hook signals.

15. A telephone message data device as defined in claim 3, in which the answer detector comprises a circuit responsive to the ringing frequency to act as a ringback detector, and means responsive to absence of ringback for a period longer than the normal interval between rings to indicate answer.

16. A telephone message data device as defined in claim 3, in which additional means are provided to disable the means responsive to on-hook signals for a predetermined delay period in order to prevent premature restoration to idle condition caused by switching equipment in the telephone exchange.

17. A telephone message data device as defined in claim 16, in which there is further means which after the expiration of said delay period, makes the means which is responsive to on-hook signals respond to disconnect hits whether positive going or negative going.

18. A telephone message data device as defined in claim 3, in which the dial at a telephone extension is of the rotary type the output of which is DC pulses at a predetermined frequency, and in which the dial signal detector is responsive to DC pulses having the said predetermined pulse frequency.

19. A telephone message data device as defined in claim 3, in which the dial at a telephone extension is of the pushbutton or "Touch-Tone" type the output of which consists of combinations of different tones, and in which the dial signal detector is responsive to the said combinations of tones.

20. A telephone message data device as defined in claim 11, in which there is means responsive to dialing for "operator assistance," which means causes the data device to cancel its program except for response to on-hook signals.

21. A telephone message data device as defined in claim 11, in which the answer detector comprises a circuit responsive to the ringing frequency to act as a ringback detector, and means responsive to absence of ringback for a period longer than the normal interval between rings to indicate answer.

22. A telephone message data device as defined in claim 1, in which the means to stop the recorder includes a counter for counting the number of digits dialed, and means to stop the recorder when a correct predetermined number of digits has been dialed.

23. A telephone message data device as defined in claim 1, in which the means to stop the recorder includes a counter for counting the number of digits dialed, means to stop the recorder when a correct predetermined number of digits has been dialed, and in which an additional means is provided to change the said predetermined count to make it appropriate for either local calls or long distance calls.

24. A telephone message data device as defined in claim 3, which includes a local source of DC voltage which approximately matches the telephone line voltage, and in which means are provided to connect the local source to the system temporarily during station identification until the caller is connected to the central office, whereupon the regular telephone line voltage is employed.

25. A telephone message data device as defined in claim 11, which includes a local source of DC voltage which approximately matches the telephone line voltage, and in which means are provided to connect the local source to the system temporarily during station identification until the caller is connected to the central office, whereupon the regular telephone line voltage is employed.